United States Patent
Ley et al.

(10) Patent No.: US 10,840,961 B1
(45) Date of Patent: Nov. 17, 2020

(54) METHOD AND APPARATUS FOR MANAGING FEATURE BASED USER INPUT ROUTING IN A MULTI-PROCESSOR ARCHITECTURE USING SINGLE USER INTERFACE CONTROL

(71) Applicant: MOTOROLA SOLUTIONS, INC., Chicago, IL (US)

(72) Inventors: David J Ley, Plantation, FL (US); Carlos J Robaina, Miramar, FL (US); Mark Antilla, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/661,850

(22) Filed: Oct. 23, 2019

(51) Int. Cl.
| | |
|---|---|
| H04M 1/00 | (2006.01) |
| H04B 1/3827 | (2015.01) |
| G06F 1/3212 | (2019.01) |
| G06F 1/3296 | (2019.01) |
| H01H 19/14 | (2006.01) |

(52) U.S. Cl.
CPC ......... *H04B 1/3833* (2013.01); *G06F 1/3212* (2013.01); *G06F 1/3296* (2013.01); *H01H 19/14* (2013.01)

(58) Field of Classification Search
CPC ... H04B 1/3833; G06F 1/3212; G06F 1/3296; H01H 19/14
USPC ........................................................ 455/575.1
See application file for complete search history.

(56) References Cited

U.S. PATENT DOCUMENTS

| | | | |
|---|---|---|---|
| 9,614,572 B2 | 4/2017 | Ley et al. | |
| 10,437,591 B2* | 10/2019 | McDonald | G06F 9/5044 |
| 2013/0219272 A1 | 8/2013 | Balasubramanian et al. | |
| 2015/0277934 A1* | 10/2015 | Zhang | G06F 9/441 |
| | | | 713/2 |
| 2016/0007136 A1* | 1/2016 | Chen | H04W 4/06 |
| | | | 370/311 |
| 2017/0277311 A1 | 9/2017 | Pollock et al. | |
| 2020/0033932 A1* | 1/2020 | Sachs | G06F 1/28 |

* cited by examiner

*Primary Examiner* — Sonny Trinh
(74) *Attorney, Agent, or Firm* — Barbara R. Doutre

(57) ABSTRACT

Improved management of feature based user input routing in a multi-processor architecture is provided. A portable communication device comprises a primary processor controlling a primary operating system, a secondary processor controlling a secondary operating system, and a user interface input control operatively coupled to the primary processor. The user interface input control is configured to enable a radio function and a secondary user input extension associated therewith. The primary processor selectively determines processing of a radio function by one of the primary and secondary processors based on activation of the user interface input control in conjunction with the user input interface extension.

22 Claims, 3 Drawing Sheets

METHOD AND APPARATUS FOR MANAGING FEATURE BASED USER INPUT ROUTING IN A MULTI-PROCESSOR ARCHITECTURE USING SINGLE USER INTERFACE CONTROL

FIELD OF THE INVENTION

This application is related to U.S. patent application Ser. No. 16/661,880 commonly assigned and filed of even date.

This application pertains to communication devices and more particularly to portable communication devices that handle user selectable features that are controlled by different processors.

BACKGROUND OF THE INVENTION

Portable battery powered communication devices are often utilized in public safety environments, such as law enforcement, fire rescue, and the like. These devices may provide mission critical communications operating over a public safety platform, such as a land mobile radio (LMR) platform or the like. There is an increased desire to expand the functionality of public safety communication devices to incorporate additional non-mission critical features which run on different operating platforms, for example an Android platform or other non-mission critical operating platform. However, incorporating multiple user selectable features that run on different platforms creates challenges in input routing in terms of prioritization of some inputs over others, particularly during power up conditions. The reliable management of user selectable features is needed to ensure that mission critical communications are maintained and take priority over non-mission critical features. At the same time, it is important to provide an improved user interface that increases user awareness pertaining to the selected features.

Accordingly, an improved approach to managing feature based user inputs in a multi-platform portable communication device is needed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
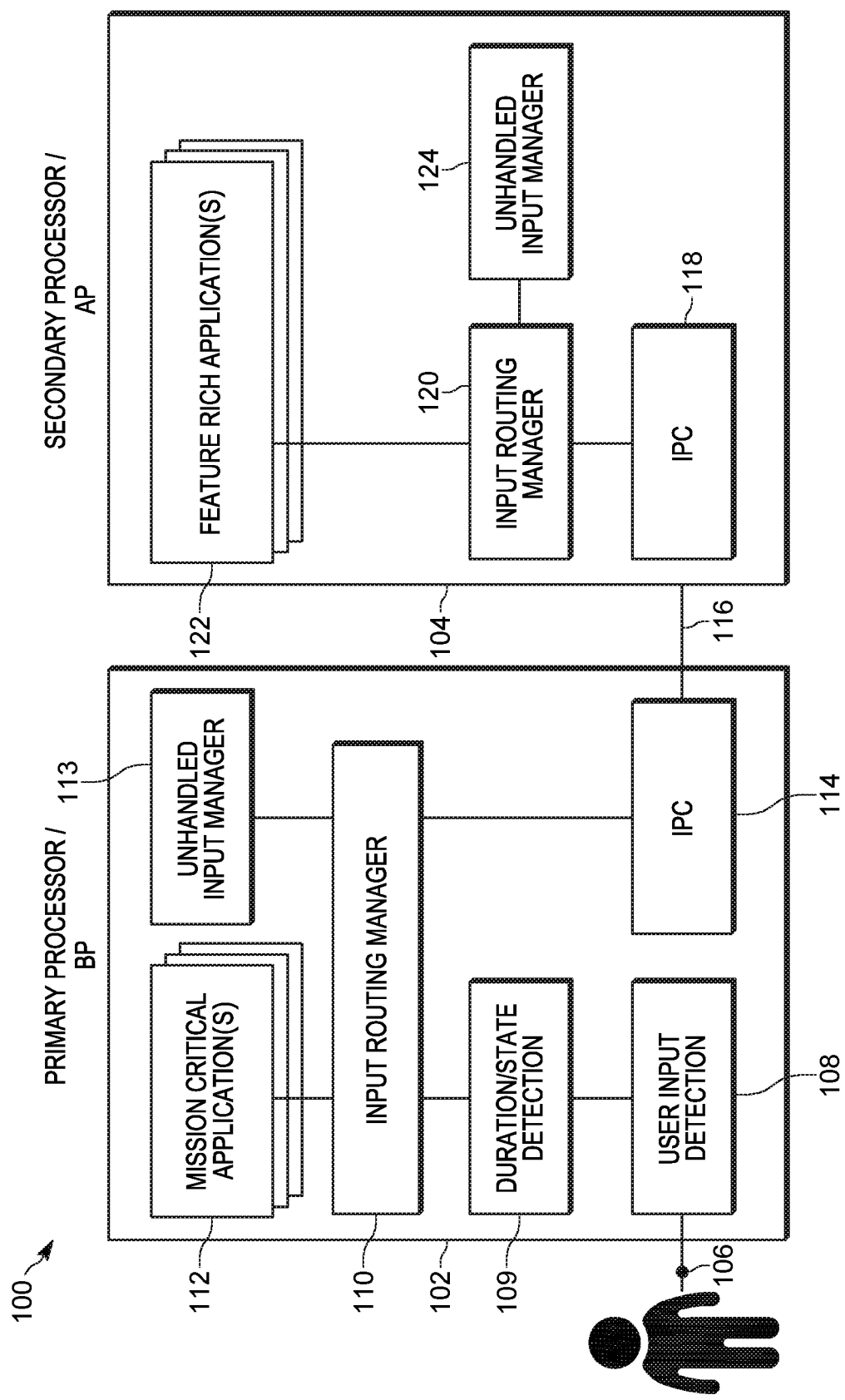
FIG. 1 is a block diagram of a portable communication device formed and operating in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an apparatus and method for managing user based inputs to a portable communication device. The portable communication device described herein is a converged device that provides expanded functionalities by incorporating two or more different processors running on different operating systems, where one processor is considered a primary processor and other processor(s) is/are considered secondary processors. In accordance with the embodiments, the user interface input control is configured for enabling a radio function based on a user input extension associated therewith. In accordance with the embodiments, the primary processor 102 selectively determines processing of a radio function by one of the primary and secondary processors 102, 104 based on activation of a single user interface input control in conjunction with the user input interface extension. User feedback, either positive or negative user feedback, is generated to alert the user of a radio function being enabled or not being enabled.

The converged device may comprise, for example a primary, baseband processor running on a land mobile radio (LMR) operating system, or other wireless operating system handling mission critical applications, and further comprise a secondary, applications processor handling non-mission critical applications. For example, the secondary applications processor may control running of LTE, WiFi or Bluetooth operating systems or other operating systems different from the primary processor operating system. The embodiments described herein pertain to managing user input requests and routing of different functions via a single user interface control. The challenges associated with application availability under varying power-up conditions is also addressed.

FIG. 1 is a block diagram of a portable communication device 100 formed and operating in accordance with various embodiments. The block diagram is representative of a controller section of the portable communication device 100, and it is to be appreciated that other sections, such as transmitter, receiver, audio, power, and battery have been omitted to maintain simplicity. The portable communication device 100 is a portable battery powered converged device operational under the control of at least two different processors operating on two different operating systems. It is to be appreciated, that while described in terms of a converged portable communication device, the block diagram may also be applied to a portable converged system comprising a portable radio and a smart accessory, where one processor is located in the portable radio and the other, different processor, is located in the accessory. The various control sections described within the block diagram of FIG. 1 (modules, detectors, routing managers, etc.) may be implemented using software modules, software modules with hardware inputs and software modules with hardware outputs.

The portable communication device 100 comprises a primary processor 102 controlling a primary operating system and a secondary processor 104, operatively coupled to the primary processor, the secondary processor controlling a secondary operating system. A user interface input control 106, such as a button or keypad external to the device, is operatively coupled to the primary processor 102. In accordance with the embodiments, the user interface input control 106 is a single user interface control configured for enabling a radio function based on a user input extension associated therewith. In accordance with the embodiments, the primary processor 102 selectively determines processing of a radio function by one of the primary and secondary processors 102, 104 based on activation of the user interface input control 106 in conjunction with the user input interface extension. In accordance with the various embodiments, the single user interface input control 106 is used to selectively manage at least two different function requests based the user input extension. In accordance with the various embodiments, the user interface button 106 may be mapped to a function common to both the primary and secondary processors 102, 104, the function being executed differently by each of the first and second processors. For example, the single user interface control may comprise a single button having first and second scan functions associated therewith, where the first scan function is handled by the primary processor and the second scan function is a different scan function handled by the secondary processor. The button is configured for entry under different input extensions, such as different button time press durations. The primary processor detects and routes the request to be handled by the appropriate processor, based on the input extension.

In accordance with the embodiments, the primary processor 102 is configured, such as through a user input detection module 108, to detect a user input feature request in response to the user interface input control 106 being activated. In accordance with the embodiments, the user input interface extension is input via the user interface input control 106 and is detected by a duration/state detector 109. In accordance with the embodiments user input extension is one of: a short press time duration of a first physical button, a long press time duration of a first physical button. The primary processor 102 is further configured to determine, via a routing manager 110, whether the user input feature request is one of: a primary processor-centric request or a secondary processor-centric request. The determination is made based on activation of the single user interface input control 106 in conjunction with the user input interface extension. The short press time duration may be a predetermined press time of, for example 500 ms or less, and the long press time duration may be a predetermined time of greater than 500 ms. The timing of the presses can be customized to a user's preference, so that the end user is easily able to manipulate the input user interface input control 106.

In accordance with the embodiments, the primary processor 102 routes a primary processor-centric request, via the input routing manager 110, to an application stored in an applications module 112 of the primary processor for handling. The primary processor 102 also generates a positive user feedback to notify the user that the primary processor-centric request will be handled and performed. If the input routing manager 110 determines that a primary processor-centric request cannot be handled, the request is forwarded to an unhandled input manager module 113, and negative feedback is generated to notify the user that the primary processor-centric request cannot be handled.

The primary processor 102 routes, such as via an interprocessor communications module (IPC) 114, a secondary processor-centric request from the primary processor to the secondary processor for handling, in response to the primary processor determining that an incoming feature request is a secondary processor-centric request and that the secondary processor 104 is available. The secondary processor 104 receives the secondary processor-centric request through a communications link 116 (a physical connection carrying protocol messages) coupling the primary IPC 114 to a second IPC 118 located in the second processor 104.

In accordance with the various embodiments, the secondary processor 104 is configured, by second input routing manager 120, to determine availability of a secondary processor application, stored within a secondary applications module 122, to handle the secondary processor-centric request routed thereto. The secondary applications stored within secondary applications module 122 may comprise, for example, non-mission critical applications. The secondary processor 104 is further configured to generate a positive user feedback in response to determining availability of the secondary processor application and to perform the secondary processor-centric request using the available secondary processor application.

In accordance with the various embodiments, the secondary processor 104 is further configured, via an unhandled input manager 124, to generate a negative user feedback in response to determining unavailability of a secondary processor application to handle the input feature request.

The input feature request may be determined to be a mission critical feature request or a non-mission critical feature request. The single user interface input control 106, as stated previously, may comprise a single button, key or some other input switch detectible by user input detector 108. For example, a single button may mapped to selectively handle both a mission critical feature and a non-mission critical feature. Mission critical requests are given priority and are handled by the primary processor 102. Non-mission critical requests may be handled by the secondary processor 104 as long as both the secondary processor and the secondary application feature within the processor are available. The primary processor can continue to detect inputs to the single interface control 106, regardless of whether a primary processor application has been enabled. Depending on the request, a secondary application may be allowed to run concurrently. If there is no contention with the primary processor, then the secondary feature request will be allowed. If there is contention, then the application having the higher priority of the most recent request will be the only application allowed to run.

Management of secondary, non-mission critical request routing and handling is optimized between the two processors 102, 104. If the secondary processor-centric request can be handled by the secondary processor, the request is formed and positive feedback is generated. If the secondary processor-centric request cannot be handled by the secondary processor, but can be handled by the primary processor as a secondary feature, then the request is handled and performed by the primary processor 102 and positive user feedback is generated. If the secondary processor-centric request cannot be handled by the secondary processor 104 because the secondary application is not available, then negative user feedback is generated. The secondary processor-centric requests that cannot be handled may be forwarded to a secondary request unhandled input manager module 124. The secondary request unhandled input manager module 124 is responsible for determining the content of the negative feedback message. If the secondary processor-centric request cannot be handled by the secondary processor 104 and cannot be handled by the primary processor 102, then negative user feedback is generated by secondary unhandled input manager module 124.

The conditions under which a secondary processor becomes unavailable may be one of: power up to secondary processor not yet complete; a low battery condition in which the secondary processor 104 has been shutdown to conserve power; or a predetermined thermal condition causing shutdown of a component required for a requested feature. For example, a display of the communication device may be shutdown under predetermined thermal conditions, and as such, resulting in a negative feedback tone or message in response to input requests that rely on the display.

The single user interface input control approach to managing routing of feature based user inputs in a multi-processor architecture is particularly advantageous to the end user, such as an officer or other public safety personnel. The input extension to the single control can be easily learned, and even programmed to an individual user if desired. The transfer of feature requests from one processor to another remains seamless to the end user. The single user interface input control approach also saves space on a portable communication device and reduces cost associated with piece parts. Additional single user interface input controls, such as additional buttons or keys, may be configured in a similar manner (one button/multi-functions) if desired. The embodiments can be extended to technician level testing by expanding the single button/multi-function approach to other more complex configurations, such as multiple presses/releases of the single physical button, simultaneous press/releases of a plurality of physical buttons each button having been configured with the multi-function extension capability, and/or sequencing of press/releases in a prescribed order of such buttons. The generation of feedback is also advantageous for technician level testing.

The primary processor 102 generally handles primary processor-centric function requests, and the secondary processor 104 generally handles secondary processor-centric function requests. The selection of the processor to handle a function in response to activation of the single user interface input control with user input interface extension is advantageously seamless to the user. In other words, the user is not made aware of which processor is handling a particular function. The user is advantageously provided with feedback that a function is being handled (or not being handled), regardless of the processor routing.

As an example embodiment, the primary processor 102 of the portable communication device 100 may comprise a baseband processor (BP), and the secondary processor may comprise an applications processor (AP) operatively coupled to the baseband processor via communications link 116. The baseband processor handles mission critical functionality and the applications processor manages non-mission critical functionality. For the purposes of this example, primary and secondary processors will be referred to as primary processor/BP 102 and secondary processor/AP 104.

The single user interface input control 106 may comprise a single user interface button or key coupled to the user input detector 108 of the primary processor/BP 102 which detects activation of the user interface input control. In accordance with the embodiments, the user input interface extension input via the user interface input control 106 is detected by the duration/state detection module 109. For example, a scan button activation is detected at user input detector 108 and a long press or a short press of the scan button is detected by duration/state detection module 109. Both mission critical applications 112 associated with the primary processor/BP 102 and non-mission critical feature applications 122 associated with the secondary processor/AP 104 are mapped within input routing manager 110 of the BP 102. The BP 102 selectively determines routing of a request using the input routing manager 110. The radio function request is thus routed within the BP 102 to mission critical applications 112 or transferred to the AP 104 for handling and processing. Mission critical functions, such as channel scan, are handled by the mission critical applications 112 of BP 102 and are immediately available upon power up of the device. Non-mission critical functions, such as scan list programming, are handled by the non-mission critical, feature applications 122 of AP 104.

The power up operations of the converged device 100 can impact the routing and processing of a non-mission critical application at the AP 104, as the secondary processor/AP 104 powers up a predetermined time (for example 20 seconds) after the primacy processor 102. During this interim power up time (BP fully powered/AP not fully powered), a user is now advantageously able to access features previously unavailable, or at the very least the user is provided with user feedback indicating that the feature is not yet available. For example, a scan list programming feature (normally handled by the secondary processor/AP), may be handled by the primary processor/BP 102 during the power up of the AP. Positive user feedback may be generated via an audible or display alert, for example a positive audible tone, or audible or displayed message "scan programming enabled". If a feature cannot be enabled by either processor, negative feedback is generated to the user. For example, a negative response tone or audible message "scan programming not yet available, please wait a moment". Again, unhandled requests and the management of feedback generation in response thereto is handled by unhandled secondary request input manager module 124. The conditions under which a secondary processor/AP 104 becomes unavailable may be one of: power up to secondary processor not yet complete; a low battery condition or other condition causing the secondary processor/AP to shutdown; or a display of the communication device being shutdown under predetermined thermal conditions, as certain features may rely on a display. Different negative user feedback can be generated based on the different conditions.

Figure 2:
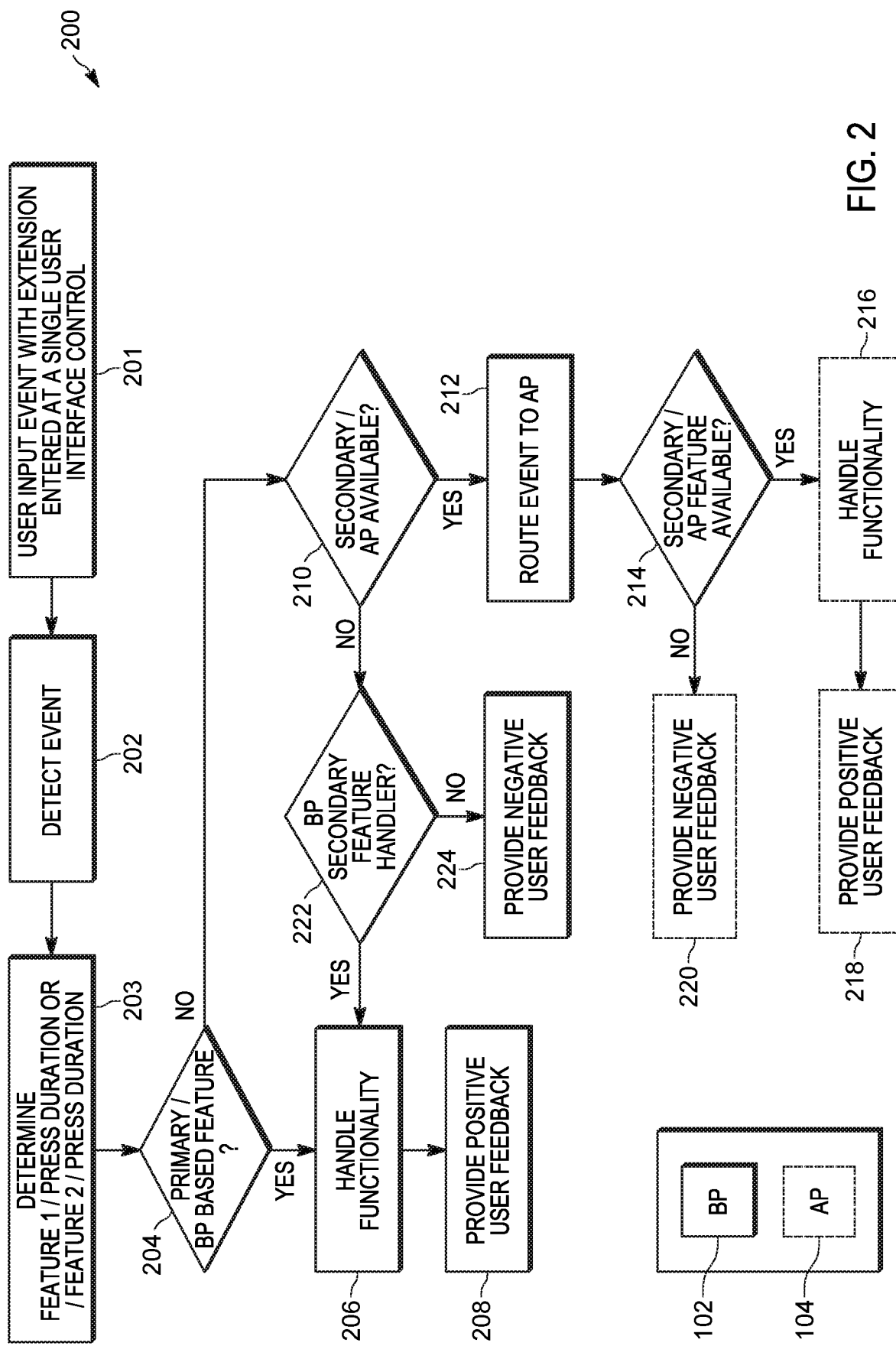
FIG. 2 is a flowchart of a method for managing feature based user inputs in a portable communication device in accordance with various embodiments.

FIG. 2 is a flowchart of a method 200 for managing a user based input to a portable communication device formed and operating in accordance with various embodiments. The method begins at 201 with a user input event being entered to the device. The user input event is entered via a single user interface input control, such as control (106) of FIG. 1, with user input extension associated therewith. The method continues with detecting at 202, by a primary processor, the user input event, and determining at 203 whether the input event with extension is indicative a primary processor-centric feature request or a secondary processor-centric feature request. From the user's standpoint the requests are simply feature requests, and the processing determination and routing are seamless and transparent to the user. For example, the user input extension may comprises a short time press duration of a button may indicative of a request for a first feature and a long time press duration of the same button may indicate a request for a second feature. Again, user interface input control (106) comprises a physical control of the device, such as a button, keypad or other physical external entry input to the device. The user input extension is a pre-stored configuration of the user interface input control which enables a particular feature or command. The user interface input control is configured to accept a plurality of physical input variations to enable functions aligned with the different processors running on different operational platforms. The user interface button is mapped to a function common to both the primary and secondary processors, the function being executed differently by each of the first and second processors. For example, a single button may be configured to control a scan function by accepting different button press durations to enable, for example a channel scan function of the primary/baseband processor and a programming scan list function of the secondary/applications processor.

The method proceeds to 204, with the primary processor determining whether the user input feature request is supported by the primary processor based on the input extension. When the user input feature request is determined to be supported by the primary processor then the handling of a primary feature is enabled by the primary processor at 206. At 208, the primary processor may further generate a positive user feedback indicating that the primary processor-centric feature is about to be performed.

Returning back to 204, when the primary processor determines that the user input feature request with extension is a secondary processor-centric feature request (and not a primary processor-centric request), then the method moves to 210 where availability of a secondary processor is determined. Again, taking into consideration power up conditions, powering up of the primary processor occurs prior to the secondary processor, and as such determining availability of the secondary processor, is performed by the primary processor, and is based on power up status of the secondary processor and receipt, by the primary processor, of a trigger alert indicative of availability and capabilities of the secondary processor. Causes for the secondary processor not being available may be for example, that the secondary processor has not yet not fully powered up, as the secondary processors powers up after the primary processor. The secondary processor may have also been turned off as part of a low battery conditions to save current.

When, at 210, the secondary processor is determined to be available then the method proceeds to 212 where the secondary processor-centric feature request is routed to the secondary processor. The secondary processor then determines, at 214, if a secondary feature application is available to handle secondary feature request, and if so, then the functionality associated with that feature is handled at 216 in conjunction with a positive user feedback being generated at 218 and the feature being performed.

Returning to 214, if the secondary processor determines that the secondary feature application is not available, then no feature is performed and negative user feedback is generated at 220, indicating to the user that the feature is not available.

When, at 210, the secondary processor is determined to not be available then the method proceeds to 222 where the primary processor is checked to determine whether the primary processor can fulfill the secondary processor-centric request. If so, then the secondary feature is performed by the primary processor at 206, along with positive user feedback being generated at 208.

Returning to 222, if the primary processor is unable to perform the secondary feature, then negative user feedback indicative thereof is generated at 224.

Method 200 thus advantageously provides user feedback under all conditions, regardless of whether the requested feature can be performed. Providing such user feedback increases user awareness of device operation.

Method 200 has been described in terms of a converged portable communication device comprising primary and secondary processors 102, 104, such as were described in FIG. 1 and which support different operating systems. Method 200 can also support a converged communication system formed of separate devices, such as a radio and user interface accessory, in which the primary processor 102 is located in one device and the secondary processor 104 is located in the second device.

As an example applicable to either the portable converged communication device or converged system, the primary processor may be a baseband processor (BP) operating on a first operational platform and the secondary processor may be an applications processor (AP) on a second, different operational platform. In some embodiments, the BP may operate in a 7/800 MHz land mobile radio (LMR) operating system and handle mainly mission critical features of the portable communication device, while the AP may operate a long term evolution (LTE) operating system and handle non-mission critical features. Feature requests are entered via a single user interface input control such as button, keypad entry, or other user interface entry and routed based on the user input extension associated with the entry. Mission critical features that can be managed via method 200 may comprise, for example, channel scan, push-to-talk and emergency to name a few. Non-mission critical features may comprise, for example, programming scan lists for the secondary/applications processor, voice control, text messaging and camera functions to name a few. For example, if the user interface input control comprises a scan button then the first press time duration of the scan button enables baseband channel scan, and the second press time duration of the scan button enables scan list programming.

Method 200 provides improved handling and routing of feature requests (mission critical and non-mission critical). The generation of user feedback in response to all requests, whether the feature can be performed or not, provides an improved user experience.

The approaches provided herein facilitate the implementation of a converged device or systems by advantageously managing two processors operating in parallel, such as a baseband processor operating in a 7/800 MHz LMR band handling mainly mission critical requests and an applications processor operating in an LTE band handling non-mission critical requests. Applying method 200 to such a device or system, the baseband processor determines (204) if an input feature request entered via a single user interface control with extensions associated therewith is a request for baseband processor (BP) centric feature or a request for an applications processor (AP) centric feature. The determination is made based on the single user interface input control 106 as detected by user input detector 108 and the duration/state of the user input extension associated with the entry as detected by duration/state detector 109.

A BP-centric feature is handled and performed by the BP (206), when the user input feature request is determined to be a BP-centric feature. Positive user feedback is generated (208) by the baseband processor in response to enabling the BP-centric feature by the BP.

When the user input feature request is an applications processor (AP) feature request (204) then availability of the applications processor (AP) is determined (210). When the AP is determined to be available (210), then AP-centric feature request is routed from the BP to the AP (212). The AP checks to determine if the requested AP-centric feature is available (214). If the AP-centric feature is available, then the AP handles the functionality, performs the AP feature and generates positive user feedback (218). For example, an audible tone, chirp, or message (audible and/or display) such as "voice control now enabled, please begin query" may be generated.

If the secondary processor determines that the AP feature application is not available (214), then no feature is performed and negative user feedback is generated (220). For example, an audible or displayed message of "sorry, voice control not ready to use" may be generated, or other tone or visual feedback may be generated.

When the AP is not be available (210) to handle an AP-centric feature request, then the primary BP is checked to determine whether the BP can handle the AP request as a secondary request (222). If the BP can handle the secondary request (for example, the BP is not in the midst of handling a mission critical BP feature), then the secondary AP feature is handled and performed by the BP (206), along with positive user feedback being generated (208).

If the BP is unable to perform the AP feature (for example, the BP is busy handling a mission critical BP feature or the BP is not equipped to handle the feature), then negative user feedback is generated (224).

User feedback can be adjusted based on the condition being managed by the different processors. For example, a negative audio tone can be generated (audible) or a message displayed when both processors are currently busy handling other functions. A feedback message of "please wait and retry feature request" can be generated when the AP has not completed power up, and the BP is not able to handle the request as a secondary request. A feedback message indicating the need to recharge the battery may be generated in response to a request occurring during a low battery condition in which the secondary processor/AP has been shutdown to conserve power. Audible feedback may be generated when a core functionality of the communication device needs to shutdown under predetermined thermal conditions. For example, the shutdown of a display module would result in a negative audible feedback to feature requests requiring a display.

The approaches provided herein facilitate the implementation of converged device or system by advantageously managing two processors operating in parallel. While examples of converged operation have been provided with a baseband processor operating on a 7/800 MHz LMR operating system and a applications processor operating on an LTE operating system, it is to be appreciated that the primary and secondary processors may operate on other different operating systems. The embodiments advantageously facilitate managing user input events and providing the user with feedback, regardless of whether the function can be performed or not.

Figure 3:
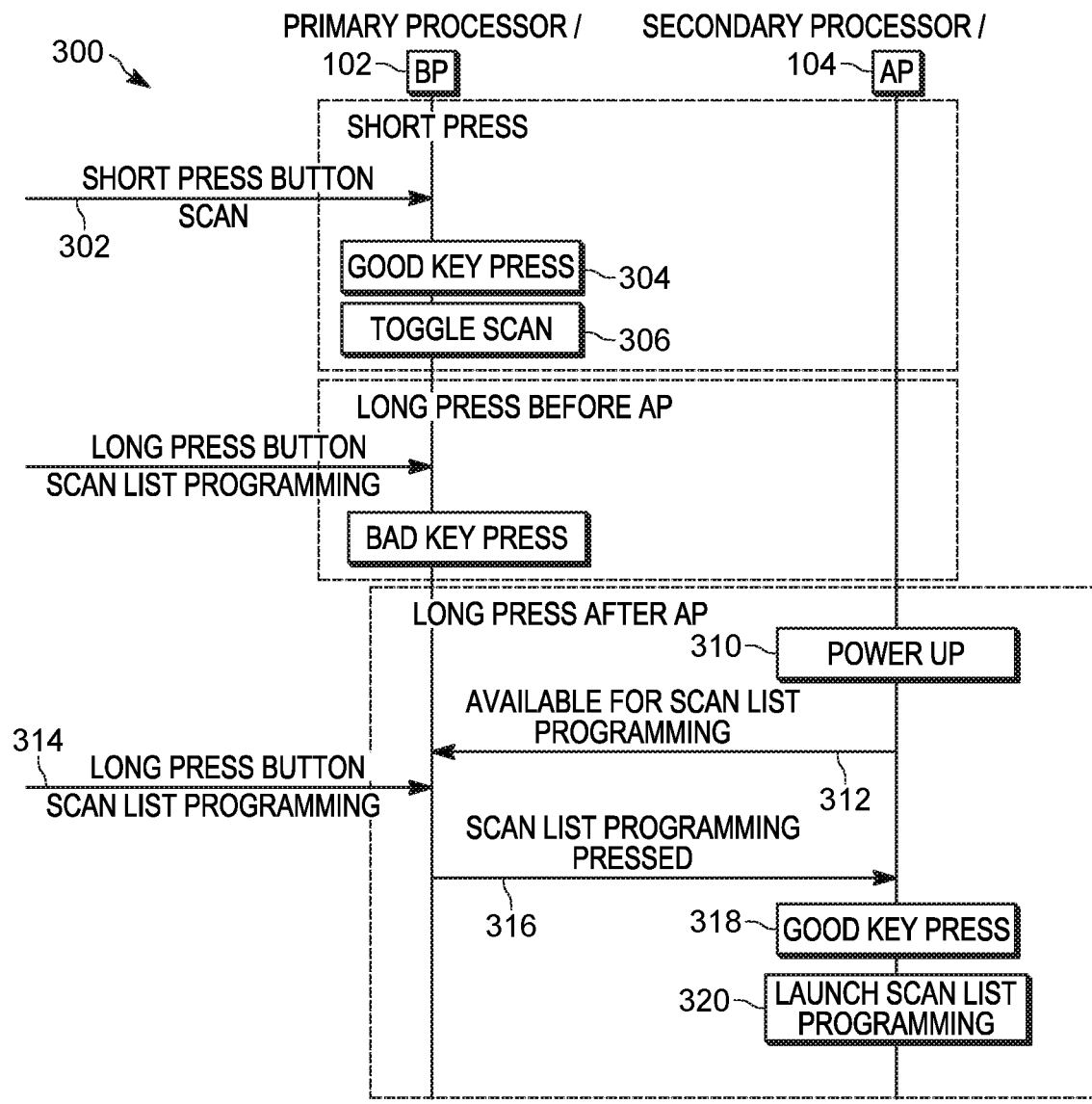
FIG. 3 is an example of an event timeline for feature based user input routing in accordance with various embodiments.

FIG. 3 is an example of an event timeline 300 for feature based user input routing in accordance with various embodiments. Timeline 300 follows a user interface input control, such as a user interface scan button, being input to the converged portable communication device of FIG. 1. The primary/baseband processor 102 may for configured to interpreted a short press of the scan button 302 as a good key press 304. In response to the short key press of the scan button, a toggle scan feature 306 is enabled in response thereto. Toggling the scan feature 306 enables scanning through a plurality of pre-stored channels associated with the primary/baseband processor 102, such as a plurality of baseband LMR channels.

The primary/baseband processor 102, in some embodiments, may also be configured to interpret a long key press of the scan button as an input to enable scan list programming. However, the long key press to the scan button will only trigger scan list programming after the secondary/applications processor has been fully powered up 310. A long key press of the scan button prior to full secondary/applications processor power up will be considered a bad key press 308.

After full power up 310 of the secondary/applications processor 104, the secondary/applications processor sends an indication to the primary/baseband processor 102 indicative of secondary/applications processor availability for scan list programming 312. A long press of the scan button 314 input to the primary/baseband processor 102, results in a scan list programming pressed message being sent 316 to secondary/applications processor 104 and interpreted by the secondary/applications processor 104 as a good key press 318, thereby launching scan list programming 320 by the secondary/applications processor 104.

Accordingly, there has been provided a converged system comprising a multi-processor architecture and a single user interface input control, such as a button, for selectively activating different features controlled by different processors of the multi-processor architecture. The different features are selectively activated based on button press timing configurations, such as predetermined button press duration times, of the single user interface button. The user interface input button may be mapped to a function common to both a primary processor and secondary processor, the function being executed differently by the primary and secondary processors thereby providing the different features The embodiments have beneficially provided for a single user interface input control interface used to route feature requests, function requests, or commands to two different processors running in parallel on different operating systems. For example, routing a scan toggle command, via a scan button, to the primary processor in response to a first press time duration of the scan button; and routing a scan list programming command to the secondary processor in response to a second press time duration of the same scan button. The single user input control provided by the various embodiments allows for fewer physical controls on the housing of the device which advantageously saves space and reduces cost due to fewer piece parts. The use of the single interface control facilitates usage of the device to the end user, such as an officer or other public safety personnel. Additional interface controls (additional buttons or keys) can be programmed in the same manner if desired. More complicated multi-button simultaneous press and/or sequencing can be used at the technician level for test mode functions.

The embodiments have further provided for a converged system comprising: a multi-processor architecture and a single user interface button for selectively activating different features controlled by different processors of the multi-processor architecture, the different features being selectively activated based on predetermined button press duration time of the single user interface button. The user interface input button may be mapped to a function common to both a primary processor and secondary processor, the function being executed differently by the first and second processors thereby providing the different features In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
   a primary processor controlling a primary operating system;
   a secondary processor controlling a secondary operating system;
   a user interface input control operatively coupled to the primary processor, the user interface input control being configured to enable a radio function based on a user input extension entered with the user interface input control; and
   the primary processor selectively determining processing of the radio function by one of the primary and secondary processors based on activation of the user interface input control in conjunction with the user input interface extension.

2. The portable communication device of claim 1, wherein the user interface input control is mapped to a function common to both the primary and secondary processors, the function being executed differently by each of the first and second processors based on the user input extension.

3. The portable communication device of claim 1, wherein the user input extension is entered using one of:
   a short press time duration of a single physical button;
   a long press time duration of the single physical button.

4. The portable communication device of claim 1, wherein the user input extension is entered using:
   a short press time duration of a single physical button to activate a mission critical function by the primary processor; and
   a long press time duration of the single physical button to activate a non-mission critical function by the secondary processor.

5. The portable communication device of claim 1, wherein the primary processor is a baseband processor and the secondary processor is an applications processor.

6. The portable communication device of claim 5, wherein the baseband processor manages mission critical functionality, and the application processor manages non-mission critical functionality.

7. The portable communication device of claim 1, wherein a negative feedback is generated in response to the user input extension being entered with the user interface input control, and the primary and secondary processors are both unavailable to handle and perform the radio function.

8. The portable communication device of claim 1, wherein a positive feedback is generated in response to the user input extension being entered with the user interface input control and the secondary processor is available to handle and perform the radio function.

9. The portable communication device of claim 1, wherein a positive feedback is generated in response to the user input extension being entered with the user interface input control, and the primary processor is available to fulfill a secondary processor-centric request while the secondary processor is unavailable.

10. The portable communication device of claim 9, wherein the secondary processor is unavailable based on one of:
   secondary processor having not completed power up;
   secondary processor being down due to a low battery condition; and
   secondary processor being down due to a thermal condition.

11. A method of managing a user based input to a portable communication device, comprising:
   detecting, by a primary processor, a user input feature request via a user input extension of a single user interface input control of the portable communication device;
   determining, by the primary processor, whether the user input feature request is supported by the primary processor, based on the user input extension to the single user interface input control;
   enabling a primary feature by the primary processor when the user input feature request is determined to be supported by the primary processor;
   determining whether a secondary processor is available when the user input feature request is determined not to be supported by the primary processor;
   routing, by the primary processor, the user input feature request, not supported by the primary processor, to the secondary processor when secondary processor is available;
   determining, by the secondary processor, whether the user input feature request is supported by the secondary processor; and
   enabling a secondary feature by the secondary processor when the user input feature request is determined to be supported by the secondary processor.

12. The method of claim 11, wherein the user interface input control is mapped to a function common to both the primary and secondary processors, the function being executed differently by each of the first and second processors based on the user input extension.

13. The method of claim 11, wherein the primary processor is a baseband processor and the secondary processor is an applications processor.

14. The method of claim 11, wherein the single user interface input control comprises a single button, and the user input extension comprises one of:
   press time duration; and
   press frequency.

15. The method of claim 11, further comprising:
   powering up the primary processor prior to the secondary processor, and
   determining availability of the secondary processor, by the primary processor, based on power up status of the secondary processor and receipt, by the primary processor, of a trigger alert indicative of availability and capabilities of the secondary processor.

16. The method of claim 11, further comprising:
   generating a negative feedback in response to the primary and secondary processors both being unavailable to handle and perform the user input feature request.

17. The method of claim 11, further comprising:
   generating a positive feedback in response to the secondary processor being available to handle and perform the user input feature request.

18. The method of claim 11, further comprising:
   generating a positive feedback in response to the primary processor being available to fulfill a secondary processor-centric request while the secondary processor is unavailable.

19. A converged system, comprising:
   a multi-processor architecture; and
   a single user interface button for selectively activating different features controlled by different processors of the multi-processor architecture, the different features being selectively activated based on predetermined button press duration time of the single user interface button.

20. The converged system of claim 19, wherein the user interface input button is mapped to a function common to both a primary processor and secondary processor, the function being executed differently by the primary and secondary processors in response to different button press duration times thereby providing the different features.

21. The converged system of claim 19, wherein the multi-processor architecture comprises a processor located in a portable radio and another, different processor, located in an accessory.

22. A portable communication device, comprising:
   a primary processor controlling a primary operating system;
   a secondary processor controlling a secondary operating system;
   a single user interface input control operatively coupled to the primary processor, the single user interface input control being configured to enable a radio function based on a user input extension entered with the single user interface input control; and
   the primary processor selectively determining processing of the radio function by one of the primary and secondary processors based on activation of the single user interface input control in conjunction with the user input interface extension, wherein the primary processor upon determining an inability to support the radio function associated with the user input extension, routes the radio function to the secondary processor, the secondary processor enabling the radio function.

* * * * *